3,155,701
XANTHATE ESTERS
Martin Hauser, Stamford, Conn., and Norbert M. Bikales, Livingston, N.J., assignors to American Cyanamid Company, Stamford, Conn., a corporation of Maine
No Drawing. Filed Dec. 26, 1962, Ser. No. 247,275
7 Claims. (Cl. 260—455)

This invention relates to, and has for its object, the provision of a new class of compounds. More particularly, it relates to a class of xanthates which can be prepared by the novel reaction between a metal salt of an O-xanthic ester and a halo-derivative of mesityl oxide. It further relates to a class of compounds, the members of which are useful as promoters in the beneficiation of ores by froth flotation. It relates still further to a class of compounds which have biocidal properties.

Other aspects will be apparent from the following detailed description in conjunction with examples showing embodiments of the present invention.

The xanthates of the present invention may be represented by the following general formulae:

$$\begin{array}{cc}
\text{CH}_3 \quad \text{X} & \text{CH}_3 \\
\diagdown \mid \mid & \diagdown \\
\text{C--C--C--CH}_3 & \text{C=C--C--CH}_3 \\
\diagup \mid \mid \parallel & \diagup \quad \parallel \\
\text{CH}_3 \quad \text{Y} \quad \text{O} & \text{CH}_3 \quad \quad \text{O} \\
\mid & \mid \\
\text{S--C--OR} & \text{S--C--OR} \\
\parallel & \parallel \\
\text{S} & \text{S} \\
\text{(I)} & \text{(II)}
\end{array}$$

wherein X and Y are hydrogen or halogen (e.g., chloro, bromo or iodo), and R is an alkyl or aralkyl group. Alkyl groups may contain up to twelve carbons and may be substituted with one or more (e.g., up to about three) electronegative groups such as halogen (e.g., chloro, bromo and fluoro), nitro, cyano or lower alkoxy groups. Aralkyl groups may be monocyclic(lower alkyl) or bicyclic(lower alkyl) groups having up to about three halo (e.g., fluoro, chloro or bromo), lower alkyl, cyano, lower alkoxy or nitro radicals.

Compounds of Formula I and Formula II are prepared by the reaction of a halo derivative of mesityl oxide with a metal salt of an O-xanthic acid ester, the reactions being represented by the following equations:

(A)  
$$\text{HALO} \quad \text{X}$$
$$(\text{CH}_3)_2\text{C--C--C--CH}_3 + \text{ROC--SM} \longrightarrow \text{(I)}$$
$$\quad\quad\quad\text{Y} \quad \text{O} \quad\quad\quad \text{S}$$

(B)  
$$\text{HALO}$$
$$(\text{CH}_3)_2\text{C=C--C--CH}_3 + \text{ROC--SM} \longrightarrow \text{(II)}$$
$$\quad\quad\quad\quad\text{O} \quad\quad\quad\quad \text{S}$$

wherein M is an alkali metal (e.g., potassium or sodium), R, X and Y are as defined above, and "HALO" is chloro, bromo or iodo. The reaction may be advantageously conducted by contacting the reactants at moderate or reduced temperatures (e.g., between $-10°$ and $40°$ C.). Proportions are not critical and equimolar amounts of both, or an excess of the halo-derivative of mesityl oxide may be used. The reaction can best be carried out in a diluent medium such as an inert polar organic solvent typified by acetone or dimethylformamide. The desired product remains in solution and the salt separates as a precipitate. If desired, the product may be purified by conventional washing techniques.

The term "halo-derivatives of mesityl oxide" as used herein embraces both addition and replacement products of mesityl oxide, both of which are known to the art. Mesityl oxide, a compound of the Formula III:

$$(\text{CH}_3)_2\text{C=CH--CO--CH}_3$$

can be hydrohalogenated (an "addition" reaction) or else halogenated either by a "replacement" reaction or an "addition" reaction. In the former case, the olefinic unsaturation in the starting material is retained. In the latter case, it is not. The halo-derivatives are of the following four types:

(1) $(\text{CH}_3)_2\text{C(halo)--CH}_2\text{CO--CH}_3$
(2) $(\text{CH}_3)_2\text{C(halo)--CH(halo)--CO--CH}_3$
(3) $(\text{CH}_3)_2\text{C(halo)--C(halo)}_2\text{--CO--CH}_3$
(4) $(\text{CH}_3)_2\text{C=C(halo)--CO--CH}_3$ Specific members of this type of halo-derivatives of mesityl oxide will be shown in the later-presented specific examples.

Among the alkali metal xanthates which can be named as suitable for reaction with the halo-derivatives of mesityl oxide are the sodium and potassium salts of the following O-xanthates:

(1) Alkyl xanthates such as methyl xanthate, ethyl xanthate, isopropyl xanthate, amyl xanthate, octyl xanthate, dodecyl xanthate, 2-chloroethyl xanthate, nitromethyl xanthate, 2-methoxyethyl xanthate, 2-n-propyl xanthate, 2-cyanoethyl xanthate, and the like.

(2) Aralkyl xanthates such as benzyl xanthate, α-naphthylmethyl xanthate, 3,4-dichlorobenzyl xanthate, phenethyl xanthate, p-chlorophenethyl xanthate, xylylmethyl xanthates, p-cyanobenzyl xanthate, anisylmethyl xanthate, p-nitrobenzyl xanthate, and the like.

Compounds of Formula I and Formula II have valuable froth flotation promoting properties, and can be used in conventional flotation operations for the recovery of copper and zinc from sulfide ores containing these metals.

The following examples are presented to further illustrate the present invention. Parts are by weight unless otherwise specified.

EXAMPLE 1

*S-[2-(2-Methyl-3-Bromo-4-Oxopentyl)] Ethyl Xanthate*

A mixture of potassium ethyl xanthate (16 parts), 3,4-dibromo-4-methyl-2-pentanone (25.8 parts) and acetone (100 parts) was stirred for 16 hours at 25°. The solution was filtered and freed of acetone at reduced pressure. The residue was dissolved in ether (100 parts) and filtered. The ether was removed at reduced pressure. The residual product, S-[2-(2-methyl-3-bromo-4-oxopentyl)] ethyl xanthate, 16 parts (55% yield), was a clear, dark-brown liquid.

EXAMPLE 2

*S-[2-(2-Methyl-3-Chloro-4-Oxopentyl)] Ethyl Xanthate*

The procedure of Example 1 was employed using potassium ethyl xanthate and 3,4-dichloro-4-methyl-2-pentanone. A 35% yield of S-[2-(2-methyl-3-chloro-4-oxopentyl)] ethyl xanthate was obtained. The product was a dark-brown liquid.

EXAMPLE 3

*S-[2-(2-Methyl-3-Bromo-4-Oxopentyl)] Isopropyl Xanthate*

The procedure of Example 1 was employed using sodium isopropyl xanthate and 3,4-dibromo-4-methyl-2-pentanone. The residual product, S-[2-(2-methyl-3-bromo-4-oxopentyl)] isopropyl xanthate (67% yield), was an amber-colored liquid.

EXAMPLE 4

*S-[2-(2-Methyl-3-Chloro-4-Oxopentyl)] Sec-Butyl Xanthate*

The procedure of Example 1 was employed using potassium sec-butyl xanthate and 3,4-dibromo-4-methyl-2-pentanone. A 64% yield of S-[2-(2-methyl-3-chloro- 4-oxopentyl)] sec-butyl xanthate was obtained. The product was a dark-red liquid.

EXAMPLE 5

*S-[2-(2-Methyl-3-Iodo-4-Oxopentyl)] Ethyl Xanthate*

The procedure of Example 1 was employed using potassium ethyl xanthate and 3,4-diiodo-4-methyl-2-pentanone. There was obtained a 77% yield of S-[2-(2-methyl-3-iodo-4-oxopentyl)] ethyl xanthate, a dark-brown liquid.

EXAMPLE 6

*S-[2-(2-Methyl-3-Bromo-4-Oxopentyl)] Amyl Xanthate*

The procedure of Example 1 was repeated using potassium amyl xanthate and 3-bromo-4-chloro-4-methyl-2-pentanone. The product, S-[2-(2-methyl-3-bromo-4-oxopentyl)] amyl xanthate (50% yield), was a dark-brown liquid.

EXAMPLE 7

*S-[3-(2-Methyl-4-Oxo-2-Pentenyl)] Ethyl Xanthate*

Potassium ethyl xanthate (8.8 parts), 2-methyl-3-bromo-4-oxo-2-pentene (9.8 parts) and acetone (75 parts) were stirred 20 hours at 25°, then refluxed for 2 hours. The mixture was filtered, acetone was stripped at reduced pressure and the residue was dissolved in ether (200 parts). The ethereal solution was filtered and the ether then stripped at reduced pressure. The residual product, S-[3-(2-methyl-4-oxo-2-pentenyl)] ethyl xanthate (14.1 parts, 84% yield), was an amber-colored liquid.

EXAMPLE 8

*S-[3-(2-Methyl-4-Oxo-2-Pentenyl)] Ethyl Xanthate*

The procedure of Example 7 was employed using potassium ethyl xanthate and 2-methyl-3-chloro-4-oxo-2-pentene. There was obtained a 72% yield of an amber liquid identical to that in Example 7.

EXAMPLE 9

*S-[3-(2-Methyl-4-Oxo-2-Pentenyl)] Isopropyl Xanthate*

The procedure of Example 7 was employed using sodium isopropyl xanthate and 2-methyl-3-chloro-4-oxo-2-pentene. There was obtained an 84% yield of S-[3-(2-methyl-4-oxo-2-pentenyl)] isopropyl xanthate, a dark-red liquid.

EXAMPLE 10

*S-[3-(2-Methyl-4-Oxo-2-Pentenyl)] Sec-Butyl Xanthate*

The procedure of Example 7 was employed using potassium sec-butyl xanthate and 2-methyl-3-bromo-4-oxo-2-propene. The residual product, S-[3-(2-methyl-4-oxo-2-pentenyl)] sec-butyl xanthate (75% yield), was a dark-brown liquid.

EXAMPLE 11

*S-[2-(2-Methyl-4-Oxopentyl)] Ethyl Xanthate*

Potassium ethyl xanthate (16 parts), 4-bromo-4-methyl-2-pentanone (17.9 parts) and acetone (150 parts) were stirred 16 hours at 25°. The mixture was filtered and acetone was stripped at reduced pressure. The residue was dissolved in ether (100 parts) and filtered. The ether was stripped at reduced pressure leaving as residue 6.1 parts (28% yield) of a dark-brown liquid, S-[2-(2-methyl-4-oxopentyl)] ethyl xanthate.

EXAMPLE 12

*S-[2-(2-Methyl-4-Oxopentyl)]Ethyl Xanthate*

The procedure of Example 11 was employed using potassium ethyl xanthate and 4-chloro-4-methyl-2-pentanone. There was obtained a 21% yield of a dark-brown liquid identical with that in Example 11.

EXAMPLE 13

*S-[2-(2-Methyl-4-Oxopentyl)] Ethyl Xanthate*

The procedure of Example 11 was employed using sodium ethyl xanthate and 4-bromo-4-methyl-2-pentanone. There was obtained 24% of a dark-brown liquid identical with that in Examples 11 and 12.

EXAMPLE 14

*S-[2-(2-Methyl-4-Oxopentyl)] Isopropyl Xanthate*

The procedure of Example 11 was employed using potassium isopropyl xanthate and 4-bromo-4-methyl-2-pentanone. The residual product, S-[2-(2-methyl-4-oxopentyl)] isopropyl xanthate (17% yield), was an amber liquid.

EXAMPLE 15

*S-[2-(2-Methyl-4-Oxopentyl)] Amyl Xanthate*

The procedure of Example 11 was employed using potassium amyl xanthate and 4-bromo-4-methyl-2-pentanone. There was obtained a 31% yield of S-[2-(2-methyl-4-oxopentyl)] amyl xanthate, a dark-brown liquid.

EXAMPLE 16

*S-[2-(2-Methyl-3,3-Dichloro-4-Oxopentyl)] Ethyl Xanthate*

Potassium ethyl xanthate (4 parts), 3,4,4-trichloro-4-methyl-2-pentanone (5.1 parts) and acetone (50 parts) were stirred 16 hours at 25°. The mixture was filtered and the acetone was stripped at reduced pressure. The residue was dissolved in ether (75 parts) and filtered. The ether was stripped at reduced pressure. The residual product, S-[2-(2-methyl-3,3-dichloro-4-oxopentyl)] ethyl xanthate (4.3 parts, 60% yield), was a dark-red liquid.

EXAMPLE 17

*S-[2-(2-methyl-3-bromo-3-iodo-4-oxopentyl)] ethyl xanthate*

The procedure of Example 16 was employed using sodium ethyl xanthate and 3,4-diodo-3-bromo-4-methyl-2-pentanone. There was obtained a 50% yied of a dark-brown liquid, S-[2-(2-methyl-3-bromo-3-iodo-4-oxopentyl)] ethyl xanthate.

EXAMPLE 18

*S-[2-(2-Methyl-3-Bromo-4-Oxopentyl)]-Dodecylxanthate*

Following the procedure of Example 1, except for the use of sodium dodecyl xanthate instead of the xanthate starting material used therein, the product is obtained.

EXAMPLE 19

*S-[2-(2-Methyl-3-Chloro-4-Oxopentyl)]-Nitromethylxanthate*

Reaction of potassium nitromethyl xanthate and 3,4-dichloro-4-methyl-2-pentanone in accordance with the procedure of Example 1 leads to the compound S-[2-methyl-3-chloro-4-oxopentyl)]-nitromethyl xanthate.

EXAMPLE 20

*S-[2-(2-Methyl-3-Bromo-4-Oxopentyl)]-Cyanoethyl Xanthate*

Following the procedure of Example 1, except for the use of sodium cyanoethyl xanthate instead of the xanthate used therein, the product is obtained.

EXAMPLE 21

*S-[2-(2-Methyl-3-Chloro-4-Oxopentyl)] Benzyl Xanthate*

Reaction of potassium benzyl xanthate and 3,4-dichloro-4-methyl-2-pentanone in accordance with the procedure of Example 1 leads to the compound, S-[2-(2-methyl-3-chloro-4-oxopentyl)] benzyl xanthate.

EXAMPLE 22

*S-[3-(2-Methyl-4-Oxo-2-Pentenyl)] Phenethyl Xanthate*

Replacement of the xanthate used in Example 1 with potassium phenethyl xanthate leads to the product, S-[3-(2-methyl-4-oxo-2-pentenyl)] phenethyl xanthate.

EXAMPLE 23

*Flotation of a Copper Ore*

In order to show the utility of the xanthates of the present invention as flotation promoters, the xanthates of Examples 2, 7 and 11 were employed in the recovery of copper from the western United States, using the following procedure. The ore sample was ground for 5 minutes at 60% solids with 0.06 lb./ton of promoter and 3.0 lbs./ton of ore, of lime (pH 9.5). It was then conditioned at 22% solids for one minute with 0.09 lb./ton of cresylic acid and 0.025 lb./ton of fuel oil. The pulp was floated for 8 minutes and the tailing analyzed for residual copper, with the following results.

Comparison was made with a conventional flotation reagent, allyl amyl xanthate.

TABLE I

| No. | Compound | Percent Cu in Tailing |
|---|---|---|
| 1 | S-[2-(2-methyl-3-chloro-4-oxopentyl)] ethyl xanthate | 0.14 |
| 2 | S-[3-(2-methyl-4-oxo-2-pentenyl)] ethyl xanthate | 0.18 |
| 3 | S-[2-(2-methyl-4-oxopentyl)] ethyl xanthate | 0.13 |
| 4 | Allyl amyl xanthate | 0.18 |

EXAMPLE 24

*Flotation of a Copper Ore*

The product of Example 1 above was tested as a promoter for a second copper ore from the western United States, using the following procedure. The ore was ground for 6 minutes at 60% solids with 1.5 lb./ton lime to bring the pH to about 7.5, and 0.05 lb./ton of the compound of Example 1. It was then conditioned for 5 minutes at 22% solids with 0.09 lb./ton of a polypropylene glycol frother. The pulp was floated for 5 minutes, leaving a tailing which analyzed only 0.11% residual copper.

We claim:

1. Compounds of the formulae:

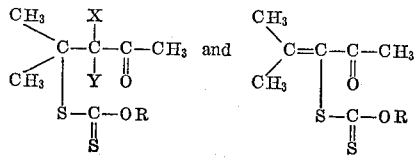

wherein R is a member selected from the group consisting of alkyl of one to twelve carbons, and aralkyl, in which the aryl group has not more than two aromatic rings, and the alkyl group has from one to twelve carbons; and X and Y are individually selected from the group consisting of hydrogen and halogen.

2. The compound S-[2-(2-methyl-3-bromo-4-oxopentyl)] ethyl xanthate.

3. The compound S-[2-(2-methyl-3-chloro-4-oxopentyl)] ethyl xanthate.

4. The comopund S-[3-(2-methyl-4-oxo-2-pentenyl)] ethyl xanthate.

5. The compound S-[3-(2-methyl-4-oxo-2 - pentenyl)] ethyl xanthate.

6. The comopund S-[3-(2-methyl-4-oxo-2-pentenyl)] sec-butyl xanthate.

7. A process of preparing a compound of the formulae:

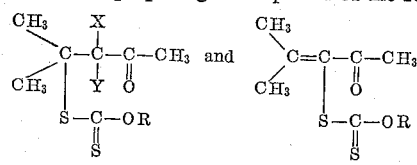

wherein R is a member selected from the group consisting of alkyl of one to twelve carbons, and aralkyl, in which the aryl group has not more than two aromatic rings, and the alkyl groups has from one to twelve carbons; and X and Y are individually selected from the group consisting of hydrogen and halogen, which comprises reacting a xanthate of the formula:

wherein M is an alkali metal and R is as above-defined, with a compound selected from the group consisting of:

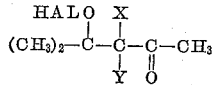

and

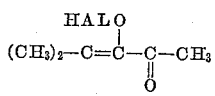

wherein X and Y are as above-defined and HALO is a member selected from the group consisting of chloro, bromo and iodo, said reaction being conducted in an inert organic diluent at a temperature in the range of about —10° C. and 40° C.

No references cited.